United States Patent [19]

Delabouglise et al.

[11] Patent Number: 5,059,694
[45] Date of Patent: Oct. 22, 1991

[54] 3-SUBSTITUTED POLYPYRROLE

[75] Inventors: Didier Delabouglise, Thiais; Marc Lemaire, Paris; Jean Roncali; Francis Garnier, both of Thiais, all of France

[73] Assignee: Nippon Oil Co., Ltd., Tokyo, Japan

[21] Appl. No.: 509,785

[22] Filed: Apr. 17, 1990

[30] Foreign Application Priority Data

Apr. 18, 1989 [JP] Japan ................................ 1-096592

[51] Int. Cl.$^5$ ..................... C07D 207/06; C08F 26/06
[52] U.S. Cl. .................................. 548/518; 526/258
[58] Field of Search .......................... 548/518; 526/258

Primary Examiner—Mary C. Lee
Assistant Examiner—Joseph K. McKane
Attorney, Agent, or Firm—Oblon, Spivak, McClelland, Maier & Neustadt

[57] ABSTRACT

There is provided a 3-substituted polypyrrole represented by the general formula (I)

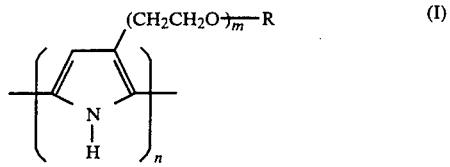

wherein R is an alkyl group having 1 to 5 carbon atoms, m is an integer of from 1 to 20, and n is an integer of 2 or more.

2 Claims, 5 Drawing Sheets

3-SUBSTITUTED POLYPYRROLE

BACKGROUND OF THE INVENTION (1) Field of the Invention

The present invention relates to a 3-substituted polypyrrole and a method for preparing it.

(2) Description of the Prior Art

Polypyrrole has already been shown to become electronically conducting upon oxidation. It is also disclosed in U.S. Pat. No. 3,574,072 that the polymerization of such a polymer can be electrochemically put into practice. The very low value of the oxidation potential of this polypyrrole ($E_{OX}=-0.1$ V/SCE) and the good environmental stability of its doped conducting state have raised a large interest, owing to the numerous expectable applications.

Heretofore a large number of works have been devoted to the controlled modification of the polymer properties by varying the dopant characteristics or chemical substitution on the pyrrole monomer. Thus, the substitution on a nitrogen atom has been mainly studied. However, the N-substitution on the polypyrrole results in a steep decrease in the conductivity ($<10^{-3}$ S·cm$^{-1}$), and also in an increase of the oxidation potential of the resulting polymer ($E_{OX}>0.6$V/SCE).

A recent work describes the functionalization of the polypyrrole by linking ferrocenyl groups to the 3-carbon atom of polypyrrole monomer through an alkyl spacer. Some other works have already pointed out that 3 or 3,4 substitution of polypyrrole monomer has much lower effect than N-substitution on conductivity of the resultant polymer.

In the case of the ferrocenyl-pyrrole monomer, however, the steric hindrance of the substituent does not allow the formation of a continuous homogeneous film. It is known that the above-mentioned problem has been overcome by copolymerizing the substituted pyrrole monomer with unsubstituted pyrrole so as to dilute the ferrocenyl function in the polymer.

On the other hand, it is actually proved by different methods that electrochemical redox process of the polypyrrole include transports in opposite directions inside the polymer, of the two electrolyte species: anions and cations. These two ionic transports can be separated in two different redox systems by using a large-sized electrolyte anion, and the present inventors have recently described the separation of ionic processes in the case of lipophilic polypyrroles.

SUMMARY OF THE INVENTION

An object of the present invention is to provide a novel polypyrrole having more excellent electrochemical reversibility as compared with conventional unsubstituted polypyrroles.

In the wake of the above-mentioned researches, the present inventors have investigated physical properties of the polypyrrole in which the 3-carbon atom is substituted with a polyalkyl ether chain, and as a result, the present invention has been completed.

That is, a 3-substituted polypyrrole of the present invention is a polypyrrole represented by the following general formula (I)

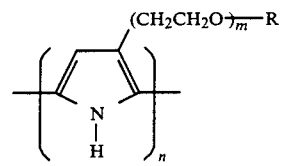

wherein R is an alkyl group having 1 to 5 carbon atoms, m is an integer of from 1 to 20, and n is an integer of 2 or more.

The 3-substituted polypyrrole of the present invention is excellent in electrochemical reversibility and exhibits moderate voltage drop at the time of self discharge, and therefore this kind of polypyrrole can be suitably used as battery electrodes and other electrical elements.

BRIEF DESCRIPTION OF THE DRAWINGS

In FIGS. 2, 3 and 5, each curve (a) is concerned with an unsubstituted polypyrrole, and each curve (b) is concerned with a poly[3-(3,6-dioxyheptyl)pyrrole].

DETAILED DESCRIPTION OF THE INVENTION

A pyrrole monomer which is used as a starting material for the synthesis of a novel 3-substituted polypyrrole regarding the present invention is a compound represented by the following general formula (II)

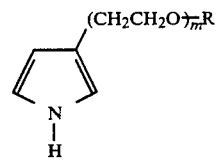

wherein R is an alkyl group having 1 to 5 carbon atoms, and m is an integer of from 1 to 20. This kind of 3- 0 substituted pyrrole, for example, 3-(3,6-dioxyheptyl)-pyrrole, can be synthesized as follows:

In the first place, the nitrogen atom of pyrrole is replaced with a certain protective group, whereby 3-substitution can be selectively achieved by the electrophilic reaction of the pyrrole. This is the same as in the case where 3-lithiopyrrole can be selectively prepared from 1-(triisopropylsilyl)pyrrole (J. M. Muchowski, R. Naef., Helv. Chim. Acta., 67, 1168, 1984).

The potential use of this intermediate is limited by appearance of concurrent elimination reactions with some substrates, but as in the present invention, 1-tosyl pyrrole 1 can be utilized effectively for the 3-acylation of pyrrole.

Figure 1:
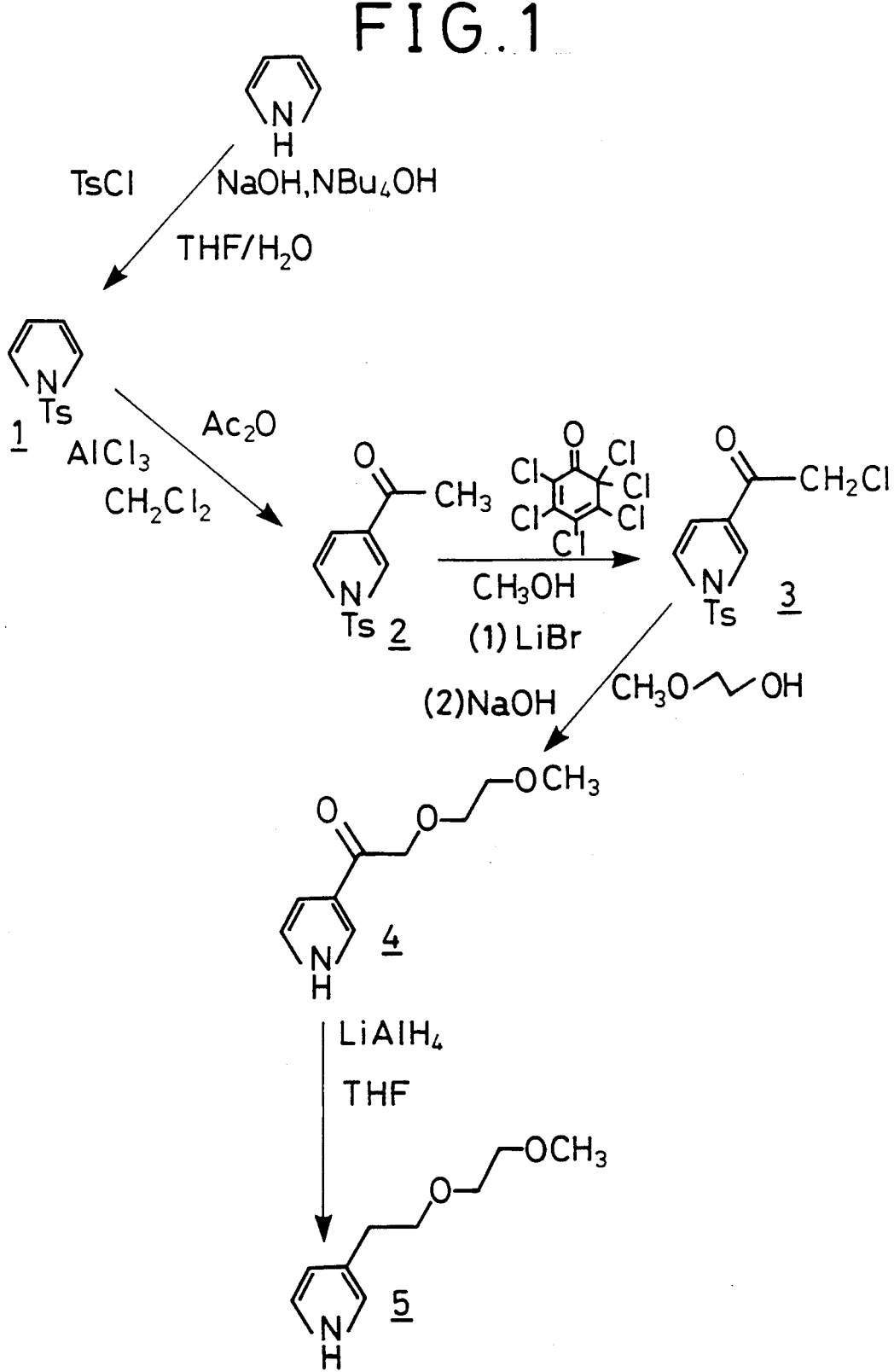
FIG. 1 is a reaction scheme illustrating the synthetic route of a monomer which is used in the present invention, FIG. 2 (2A-2B) shows a cyclic voltammogram regarding a 1 M lithium perchlorate solution in propylene carbonate.

It is already known that the selective α-chlorination of aromatic ketones can be carried out by using hexachloro-2,4-hexadienone, and when this method is used, 3-acetyl-1-tosyl pyrrole 2 can be converted into 3-chloroacetyl-1-tosyl pyrrole 3. Next, 3-chloroacetyl-1-tosyl pyrrole 3 is reacted with 2-methoxyethanol using lithium bromide as a halogen substitution auxiliary in accordance with a nucleophilic substitution reaction, in order to obtain a linear oxyalkyl ketone 4- of pyrrole. The latter is then reduced, thereby finally producing desired 3-(3,6-dioxyheptyl)pyrrole 5. The aforesaid reaction scheme is shown in FIG. 1.

The 3-substituted polypyrrole represented by the above-mentioned general formula (I) of the present invention can be prepared by subjecting the monomer (II) to electrolytic oxidation polymerization in the presence of a conductive salt. A typical example of the conductive salt which can be used in such a polymerization process is a salt of (a) one or more cations selected from the group consisting of $H^+$, $Li^+$, $Na^+$, $K^+$, $R^1{}_4N^+$ and $R^1{}_4P^+$ (wherein each $R^1$ is independently a hydrogen atom, an alkyl group, a cycloalkyl group or an aryl group) and (b) one or more anions selected from the group consisting of $BF_4^-$, $AsF_4^-$, $AsF_6^-$, $SbF_6^-$, $SbCl_6^-$, $PF_6^-$, $ClO_4^-$, $HSO_4^-$, $SO_4^{2-}$ and

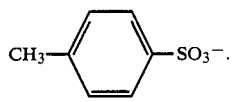

In this method, the above-mentioned conductive salt is used as an electrolyte in the form of a solution having a concentration of 0.001 to 10 moles/liter, preferably 0.01 to 1 mole/liter, and the 3-substituted pyrrole represented by the general formula (II) is added to the electrolyte so that the concentration of the pyrrole may be 0.01 to 1 mole/liter. Afterward, direct current is applied thereto, whereby the polymer represented by the general formula (I) is deposited and grows on the surface of an anode, and it can be obtained in the form of a film.

As the solvent for the electrolyte, any one can be used, so long as it can dissolve the 3-substituted pyrrole represented by the general formula (II). Examples of the solvent include organic solvents such as benzonitrile, acetonitrile, propylene carbonate, dimethylformamide, tetrahydrofuran and nitrobenzene, water and mixtures thereof.

In addition to the above-mentioned method, the 3-substituted polypyrrole of the present invention can be prepared by chemically oxidizing the raw material, 3-substituted pyrrole by the use of an oxidizing agent having a higher oxidative potential than the 3-substituted pyrrole, for example, an $Fe^{3+}$ compound, as in the case that polymers of other pyrroles are prepared.

In the chemical oxidizing process, the reaction can be carried out in a solvent system or a non-solvent system, and the polymer can be directly obtained in the state of a solvent-insoluble powder or a film-like solid. As the reaction solvent, any one can be used without particular restriction, so long as it does not react with the oxidizing agent. Preferable examples of the reaction solvent include water, lower alcohols, acetone, acetonitrile and mixtures thereof.

In the reaction of the solvent system, any particular restriction is not put on concentrations of the raw material pyrrole compound and the oxidizing agent, and the respective concentrations thereof are in a range of from 0.001 mole/liter to the level of saturation.

In the present invention, the polymer obtained by the above-mentioned process takes the structure represented by the general formula (I), but a certain kind of polymer is doped with the conductive salt used in the polymerization reaction or the cation of the oxidizing agent.

Figure 2B:
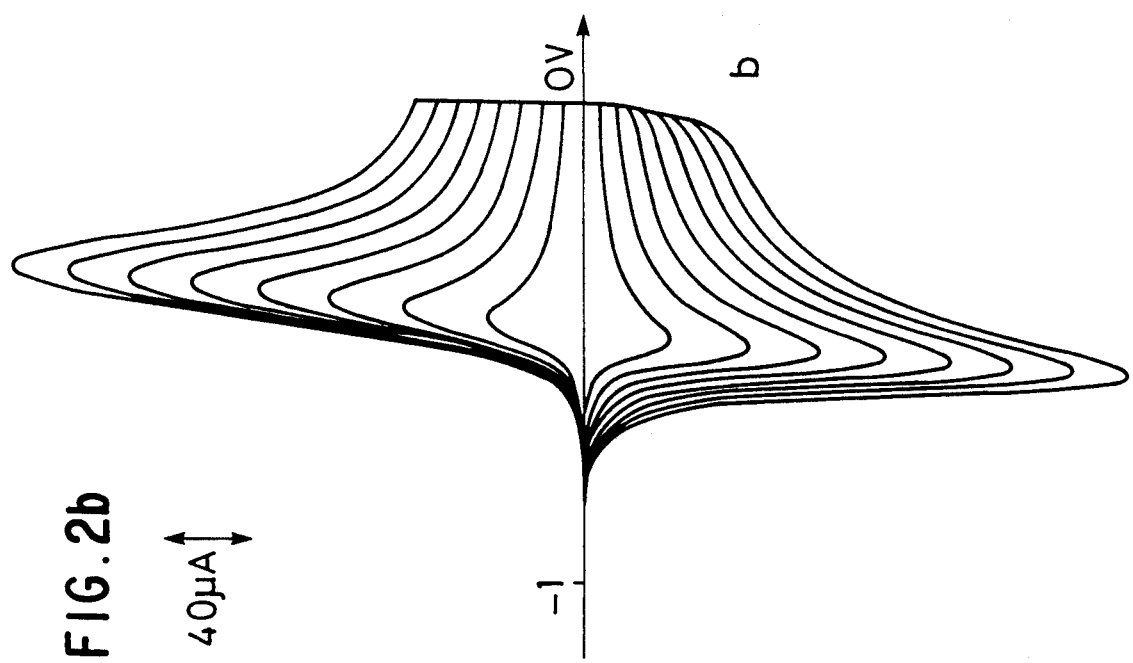
Figure 2A:
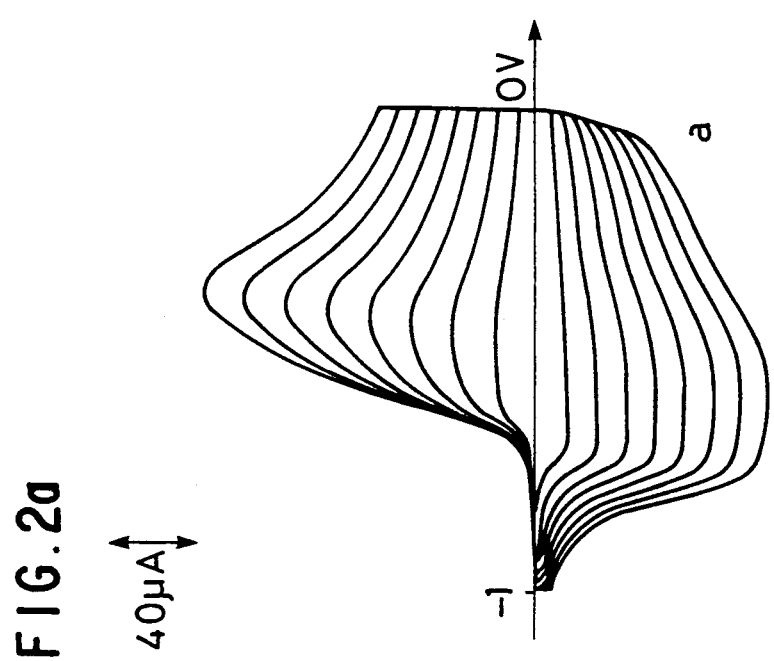

The novel 3-substituted polypyrrole of the present invention exhibits the same amount of exchanged charge (y=0.3) as in the case of the unsubstituted polypyrrole during the electrochemical redox process, but the shape of the cyclic voltammogram shown in FIG. 2 indicates that the 3-substituted polypyrrole of the present invention exhibits a more reversible electroactivity. Here, in FIG. 2 and the undermentioned figures, the curve (a) denotes measured results of the unsubstituted polypyrrole and the curve (b) denotes measured results of the poly[3-(3,6-dioxyheptyl)pyrrole].

Figure 3:
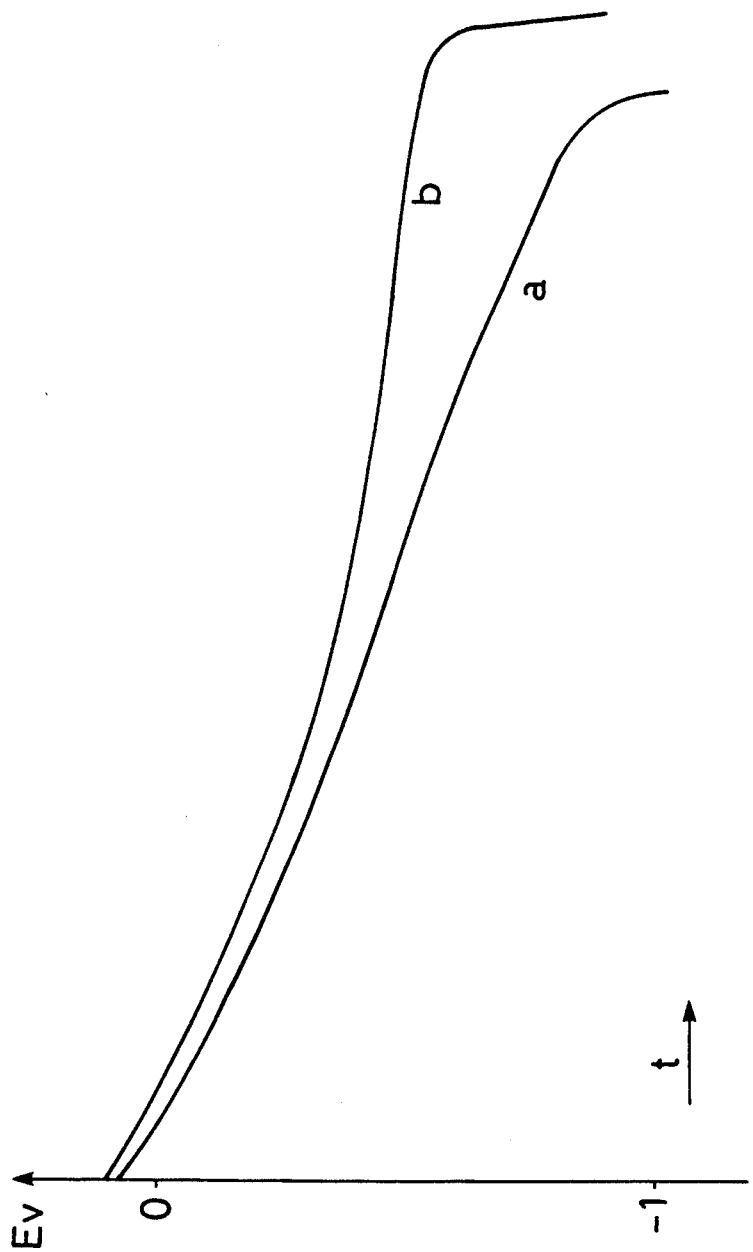
FIG. 3 shows E-t discharge curves.
Figure 4:
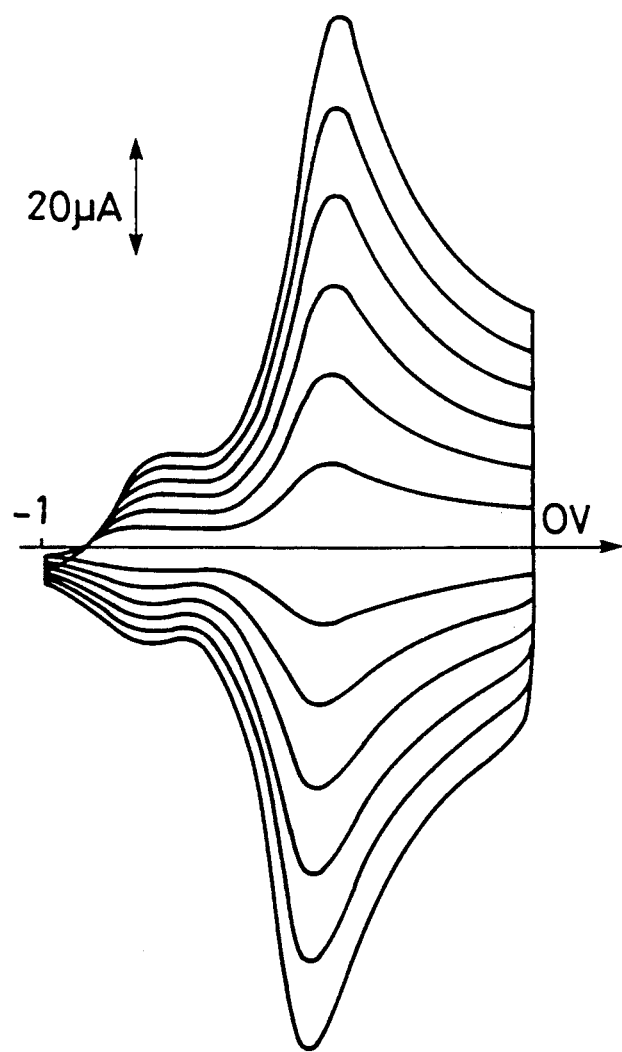
FIG. 4 shows a cyclic voltammogram regarding a 0.1 M tetrabutylammonium trifluoromethanesulfonate in an acetonitrile solvent.

This feature of the present invention is also evidenced by comparing discharge curves of these polymers shown in FIG. 3, and the discharge potential of the 3-substituted polypyrrole is more stable, since the drop in this potential is gentle.

This important feature can be explained by cation complexation in the case of lithium salts, but the great enhancement of film thickness induced by substitution (5 $\mu$m $C^{-1}$ cm$^2$ compared to 2 $\mu$m $C^{-1}$cm$^2$ for polypyrrole) suggests a more dilated polymeric matrix. This latter observation is also supported by cyclic voltammograms obtained with lipophilic salts.

Furthermore, as in the case of 3-alkyl-substituted polypyrrole [poly(3-octylpyrrole)], the separation of the redox systems associated with anion and cation transports is observed. The major process (anion process) is perfectly reversible and the total amount of charge exchanged by the two systems is near the value obtained with lithium salt (y=0.26).

Figure 5:
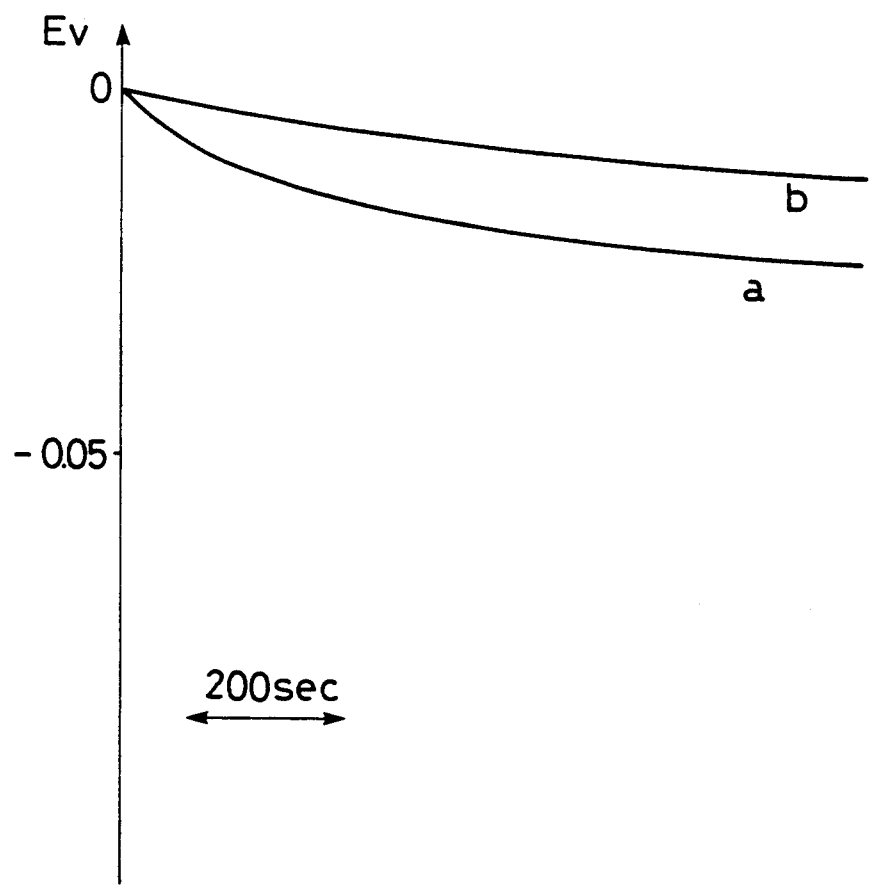
FIG. 5 shows self discharge E-t curves.

The novel 3-substituted polypyrrole according to the present invention exhibits very excellent characteristics. That is, when used as electrochemical switch, the 3-substituted polypyrrole exerts more excellent structural properties than other conductive polymers. Moreover, the polyether chains grafted on the macromolecule can be expected to enhance capacity of all-solid state apparatus using the 3-substituted polypyrrole and polyoxyethylene by better interface permeability. Furthermore, when employed as a typical battery electrolyte, the 3-substituted polypyrrole of the present invention is more reproducible and exhibits slower self discharge than that of polypyrrole, as shown in FIG. 5.

Now, the present invention will be described in more detail in reference to examples, but the scope of the present case should not be limited to these examples.

EXAMPLE 1

Synthesis Example

Experimental Part

A. Synthesis of 3-(3,6-dioxy heptyl) pyrrole 1. 1-Tosyl Pyrrole

In a 1-liter three-neck flask, 8.65 cm$^3$ of freshly distilled pyrrole (125 mmoles) was introduced together with 100 cm$^3$ of THF and 1 cm$^3$ of a 40% aqueous solution of tetrabutylammonium hydroxide. 125 cm$^3$ of a 50% aqueous NaOH solution was added and the mixture was then vigorously stirred. After 5 minutes, a solution of 38 g of tosylchloride (200 mmoles) in 100 cm$^3$ of THF was dropwise added. The obtained adduct was maintained under stirring until the temperature reached a maximum and then again during some 30 minutes more. After decantation, the aqueous layer was extracted with ethyl acetate, and the combine organic layer was concentrated under reduced pressure. The residue was dissolved in dichloromethane, washed with water, dried over magnesium sulfate and evaporated. 27 g of a white solid compound was obtained (1) (M=221, yield: 97.6%). Recrystallization in methanol. F (° C)=92. Elemental analysis: calc.: C 59.73; H 4.98; N 6.33; found: C 59.59; H 4.67; N 6.32. NMR: (CDCl$_3$) ppm 7.7 d J(Hz) 8 2H; 7.2 4H; 6.25 2H; 2.33 s 3H.

2. 3-Acetyl-1-Tosyl Pyrrole

In a 1-liter three-neck flask fitted with a thermometer, a 50 cm$^3$ funnel and a condenser with calcium chloride guard, 500 cm$^3$ of dichloromethane and 80 g anhydrous aluminum chloride (600 mmoles) were added. 30 cm$^3$ of acetic anhydride (320 mmoles) was dropwise added. The solution was stirred during 10 minutes. Then a 60 cm$^3$ of dichloromethane solution containing 27 g of 1-tosyl pyrrole 1 (122 mmoles) was dropwise added. The stirring was maintained during 2 hours at room temperature, then the resulting solution was poured on 500 cm$^3$ of water-ice mixture. After decantation, the aqueous layer was extracted with dichloromethane. The combine organic layer was washed with water, dried over magnesium sulfate and concentrated under reduced pressure to give 31 g of purple crystals 2 (M=263, yield: 96.7%). F (° C)=87 (purified by chromatography). NMR: (CDCl$_3$) ppm 7.7 d J(Hz) 8 2H; 7.2 4H; 6.62 2H; 2.35 s 6H.

3. 3-Chloroacetyl-1Tosyl Pyrrole

In a 100 cm$^3$ one neck flask fitted with a condenser and a calcium chloride guard, 4 g of 3-acetyl-1-tosyl pyrrole 2 (15 mmoles) was introduced together with 30 cm$^3$ of methanol. Then 4.5 g of 2,3,4,5,6,6-hexachloro-2,4-hexadiene-1-one (15 mmoles) was set under reflux during 6 hours and maintained under stirring at ambient temperature during one night. The solvent was evaporated and the crude product (8.5 g) was dissolved in 15 cm$^3$ of chloroform, filtered (the pentachlorophenol was not very soluble in this solvent) and separated on silica gel column (250 g; 60–200 82 m; eluting with 1-29-70 acetic acid-ethyl acetate-heptane; V$_R$=650 cm$^3$) to give 2.35 g of white crystals 3 (M=297.5, yield: 53%).

F (° C)=120. NMR: (CDCl$_3$) ppm 7.75 3H; 7.3 J(Hz) 9 2H; 7.1 1H; 6.65 1H; 4.35 s 2H; 2.35 s 3H. IR (cm$^{-1}$) CH arom. 3140; C=O: 1690.

4. 3-(2-Methoxy Ethoxy Acetyl) Pyrrole

In a 100 cm$^3$ three neck flask fitted with a thermometer, a condenser with a bubbler and an argon inlet, 2.35 g of 3-chloroacetyl-1-tosyl pyrrole 3 (8 mmoles) was introduced together with 50 cm$^3$ of 2-methoxy ethanol. 3 g of lithium bromide was added and the solution was set under reflux and argon flux during 24 hours. After cooling, 20 cm$^3$ of 5 N aqueous solution of sodium hydroxide was added and the mixture was maintained under stirring at ambient temperature during 24 hours. 20 cm$^3$ of brine was added and after decantation, the aqueous layer was extracted with ethyl acetate. The combine organic layer was washed with brine, dried and evaporated. The crude product (1.4 g) was dissolved in a little amount of methanol and separated on a silica gel column (150 g; 60–200 μm; eluting with 1-2-9-70 acetic acid-ethyl acetate-heptane) to give 0.42 g of purified product 4 (M=183, yield: 29%). NMR: (CDCl$_3$) ppm 7.5 1H; 6.7 1H; 6.6 1H; 4.5 s 2H; 3.6 4H; 3.3 s 3H.

5. 3-(3,6-Dioxy Heptyl) Pyrrole:

In a 100 cm$^3$ four neck flask fitted with a thermometer, a condenser with a bubbler, an argon inlet and a 50 cm$^3$ funnel, 0.5 g of lithium aluminum hydride and 20 cm$^3$ of THF distilled over sodium were introduced under argon flux. A solution of 0.42 g of 3-(2-methoxy ethoxy acetyl) pyrrole 4 (2.3 mmoles) in 30 cm$^3$ of dried THF was slowly added. The mixture was refluxed for 1.5 hours, cooled and quenched slowly with brine under argon flux. The whity muds were filtered, washed with THF and the combine organic layer was concentered under reduced pressure to give 0.3 g of crude product which was then distilled in a short path still (1.5 mm) to give 0.17 g of colorless liquid 5 (M=169, yield; 43%). NMR: (CDCl$_3$) ppm 6.5 2H; 5.95 1H; 3.5 6H; 3.25 s 3H; 2.67 t J(Hz) 7 2H.

B. Poly[3-(3,6-Dioxy Heptyl) Pyrrole]

1. Electropolymerization 25 cm$^3$ of a solution containing 0.17 g of 3-(3,6-dioxyheptyl) pyrrole 5 (1 mmole, 0.04 M) and 0.25 g of lithium perchlorate (0.1 M) in distilled propylene carbonate, were introduced in a three-electrode electrochemical cell. The solution was degassed by argon bubbling during 15 minutes. The reference electrode involved Ag/AgNO$_3$ 0.1 M in acetonitrile with a guard containing lithium perchlorate 0.1 M in acetonitrile. The polymerization was performed on a 0.07 cm$^2$ area platinum electrode with a platinum wire as counter electrode, at a constant potential of 0.5 V.

2. Voltammetric analysis 25 cm$^3$ of a solution 1 M of lithium perchlorate in distilled propylene carbonate was introduced in the same electrochemical cell as in the above-mentioned electropolymerization 1. The same electrodes were used. The working electrode was covered with a film of poly[3-(3,6-dioxy heptyl) pyrrole](0.1 C/cm2). Typical voltammograms were obtained by potential sweeps between −1 and 0 V. (FIG. 2).

3. Discharge Curve

In the same conditions as in the above-mentioned voltammotric analysis 2 and with a thicker polymeric film (0.5 c/cm$^2$) synthesized in the conditions described in the above-mentioned electropolymerization 1, a constant discharge current of 0.01 mA was imposed and the E-t curve was registered.

4. Self-Discharge

In the same conditions as in the above-mentioned voltammotric analysis 2 and with the same polymeric film (0.1 C/cm$^2$) in the oxidized form at 0 V., the E-t curve obtained after opening the circuit, was registered (FIG 5).

5. Conductivity

In the electrochemical cell used in the above-mentioned electropolymerization 1, a plane platinum electrode on which an area of 3 cm$^2$ was delimited with PARAFILM, and an aluminum foil, were used as working and counter electrode, respectively. A film of poly[3-(3,6-dioxy heptyl) pyrrole]was electrodeposited (2 C/cm$^2$) in the conditions used in the above-mentioned electropolymerization 1, peeled off the electrode, washed in acetone and dried in ambient atmosphere. The obtained film was tough, blue-black colored; the electrolyte side was smooth and the electrode side was bright; the thickness was 10 μm and the conductivity measured by four-probe technic was 2 S/cm.

EXAMPLE 2

Synthesis of 3-(3,6,9-Trioxy Decyl) Pyrrole

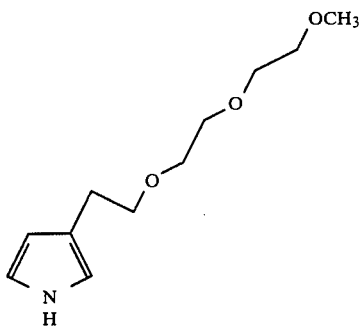

The synthesis of 3-(3,6,9-trioxy decyl) pyrrole was carried out following the same procedure as in Example 1 except that methoxy-2-ethanol was replaced with diethylene glycol monomethyl ether. The total yield was 3.2%.

NMR: (CDCl$_3$) ppm 6.5 2H; 5.95 1H; 3.6 10H; 3.4 s 3H; 2.66 t J(Hz)7 2H

Electropolymerization of Poly[3-(3,6,9-Trioxy Decyl) Pyrrole]

Electropolymerization was carried out following the same procedure as in Example 1 except that 3-(3,6,9-trioxy decyl) pyrrole was used. According to cyclic voltammograms obtained by measurement, the product poly[3-(3,6,9-trioxy decyl) pyrrole] was excellent in electrochemical properties.

What is claimed is:

1. A 3-substituted polypyrrole represented by the following formula (I)

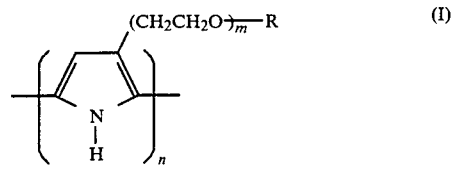

wherein R is an alkyl group having 1 to 5 carbon atoms, m is an integer of from 1 to 20, and n is an integer of 2 or more.

2. A 3-substituted polypyrrole according to claim 1 represented by the following formula

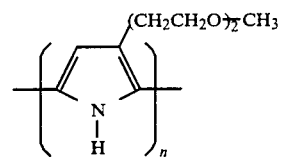

wherein n is an integer of 2 or more.

* * * * *